US011570279B1

(12) United States Patent
Kairali et al.

(10) Patent No.: US 11,570,279 B1
(45) Date of Patent: Jan. 31, 2023

(54) AUTOMATED PORT CONFIGURATION MANAGEMENT IN A SERVICE MESH

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/681,046

(22) Filed: Feb. 25, 2022

(51) Int. Cl.
   | | |
   |---|---|
   | G06F 15/177 | (2006.01) |
   | H04L 67/63 | (2022.01) |
   | H04L 67/025 | (2022.01) |
   | H04L 41/16 | (2022.01) |
   | H04L 67/00 | (2022.01) |
   | H04L 9/40 | (2022.01) |

(52) U.S. Cl.
   CPC .............. *H04L 67/63* (2022.05); *H04L 41/16* (2013.01); *H04L 63/0236* (2013.01); *H04L 63/1425* (2013.01); *H04L 67/025* (2013.01); *H04L 67/34* (2013.01)

(58) Field of Classification Search
   None
   See application file for complete search history.

(56) References Cited

U.S. PATENT DOCUMENTS

| | | | |
|---|---|---|---|
| 10,656,929 B2 | 5/2020 | Jamjoom | |
| 10,983,769 B2 | 4/2021 | White | |

(Continued)

FOREIGN PATENT DOCUMENTS

FR    3096529 A1    11/2020

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Phuoc H Nguyen
(74) *Attorney, Agent, or Firm* — Christopher M. Pignato

(57) ABSTRACT

Systems, methods and/or computer program products for managing and dynamically automating service mesh communications between microservices, eliminating unnecessary exposure of microservice ports and increasing security between microservices of the service mesh. The control plane collects data describing communications between microservices and tracks the frequency at which microservices communicate. Collected data is fed to machine learning models which outputs a forecast predicting future communication interactions between microservices. Using the predicted requirements for facilitating communications between microservices of the service mesh, an allowed list of communications can be generated describing the microservices allowed to send and receive communications, duration of communications allowed, when such communications are allowed, and the ports that will be used for facilitating the communication between microservices. Administrators of the service mesh may manually override the one or more approved aspects of the dynamically generated allowed list configured automatically by the service mesh.

17 Claims, 7 Drawing Sheets

(56) References Cited

U.S. PATENT DOCUMENTS

| | | | | |
|---|---|---|---|---|
| 2010/0205291 A1* | 8/2010 | Baldry | ................. | G06F 16/958 |
| | | | | 709/224 |
| 2010/0205297 A1* | 8/2010 | Sarathy | .................. | H04L 63/20 |
| | | | | 709/224 |
| 2016/0073252 A1* | 3/2016 | Spencer | ............... | H04W 8/005 |
| | | | | 709/224 |
| 2018/0095855 A1* | 4/2018 | Sanakkayala | ........... | H04L 43/10 |
| 2018/0248757 A1* | 8/2018 | Kaag | ....................... | H04L 12/12 |
| 2018/0331960 A1* | 11/2018 | Browne | ............. | H04L 63/0209 |
| 2019/0004871 A1 | 1/2019 | Sukhomlinov | | |
| 2019/0334837 A1* | 10/2019 | Fairhurst | ............ | H04L 49/9005 |
| 2022/0149888 A1* | 5/2022 | Tsui | ................. | H04W 72/0413 |

OTHER PUBLICATIONS

Pourya, "Time Series Machine Learning Regression Framework", Medium, Apr. 6, 2019, 29 pages, <https://towardsdatascience.com/time-series-machine-learning-regression-framework-9ea33929009a>.

* cited by examiner

AUTOMATED PORT CONFIGURATION MANAGEMENT IN A SERVICE MESH

BACKGROUND

The present disclosure relates generally to the field of microservice architecture, and more specifically to service meshes and techniques for managing communications and network policies between the microservices of a service mesh.

Modern applications are often broken down into this microservice architecture, whereby a loosely coupled and independent network of smaller services each perform a specific business function. The microservices architecture lets developers make changes to an application's services without the need for a full redeploy. Microservices operate on a principle reflecting a single responsibility per service being deployed. Microservices are built independently, communicate with each other, and can individually fail without escalating into an application-wide outage. A microservice may typically be represented by a container or groups of containers (i.e., a POD in certain environments such Kubernetes). The microservices communicate via a defined interface using lightweight API's. Because microservices run independently of each other, each service can be updated, deployed and scaled to meet demand for specific functions of an application. In order to execute microservice functions, one service might need to request data from several other services.

A service mesh provides a way to control how different parts of an application share data with one another. The service mesh is a dedicated infrastructure layer built right into an application. This visible infrastructure layer can document how well different parts of an application interact with one another, making it easier to optimize communication and avoid downtime as an application grows and changes over time. Each microservice of the application can rely on other microservices to complete transactions, tasks or other functions requested by users. The service mesh routes requests from one service to the next, optimizing how all the moving parts of the network of microservices work together. The service mesh takes the logic governing service-to-service communication out of individual services and abstracts the logic to the layer of infrastructure. Requests are routed between microservices of the service mesh through proxies in the infrastructure layer; sometimes individually referred to as "sidecars" because the proxies run alongside each service rather than within the service. Taken together, the "sidecar" proxies decoupled from each service form the mesh network. Within complex microservice architectures, locating problems can be nearly impossible without a service mesh. The service mesh is able to capture aspects of service-to-service communication as performance metrics. Over time, data made visible by the service mesh can be applied to the rules for interservice communication, resulting in more efficient and reliable services.

SUMMARY

Embodiments of the present disclosure relate to a computer-implemented method, an associated computer system and computer program products for managing port configurations of microservices within a service mesh. The computer-implemented method comprising: collecting, by the service mesh, time series data describing communications between a first microservice and a second microservice of a microservice chain; tracking, by the service mesh, historical communications between the first microservice and the second microservice; forecasting, by the service mesh, future communications between the first microservice and second microservice of the microservice chain based on the time series data collected by the service mesh and patterns of the historical communications tracked by the service mesh; generating, by the service mesh, as a function of forecasting the future communications, an allowed list describing one or more permitted ports of the second microservice configured to receive incoming traffic from the first microservice; identifying, by the service mesh, an absence of communication between the first microservice and the second microservice for a threshold period of time, or communications routed from the first microservice of the allowed list to the second microservice as being vulnerable to manipulation or insecure; disabling, by the service mesh, the permitted ports of the second microservice configured to receive communications from the first microservice; and re-configuring, by the service mesh, the allowed list, preventing the future communications between the first microservice to the second microservice.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
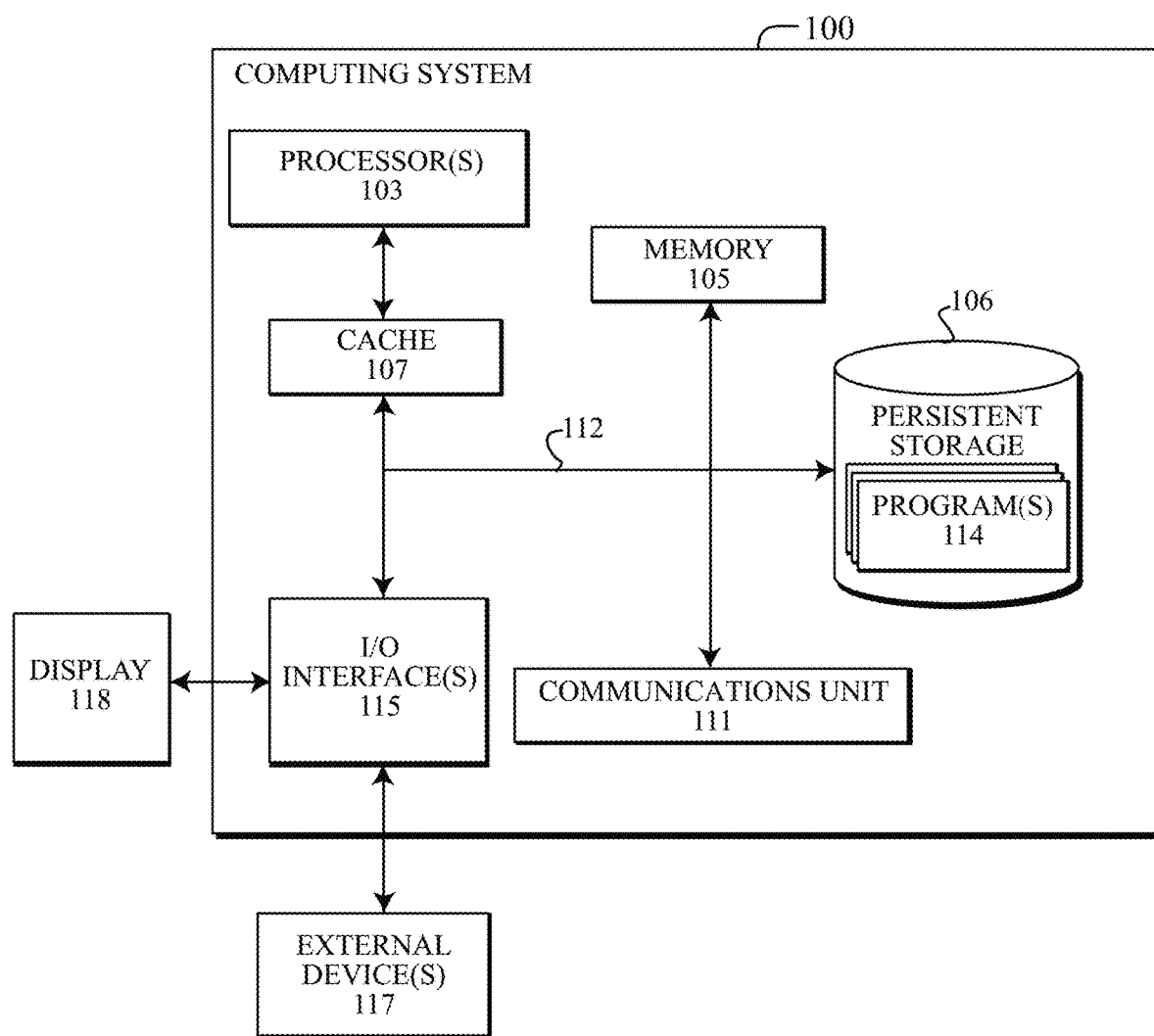
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Microservices of a service mesh architecture are networked together, allowing communications to be routed between the microservices according to particular rules of the service mesh. A control plane of the service mesh knows about each and every microservice in detail. The control plane may specifically focus on the networking between microservices and rules for routing communications. When microservices of the service mesh are part of a microservice chain, the microservices may be configured to enable incoming and outgoing ports for communication between microservices within the microservice chain. During configuration of the microservices, the control plane can designate which microservices are allowed to approach other microservices, which ports can be used for communications between microservices and designated protocols that are acceptable for sending and/or receiving the communications. However, communications between microservices may not always be occurring. Microservice communications may occur periodically, at specific times of day, days of the week, for specified lengths of time, and/or only a limited number of times per designated time period. Leaving configured ports of the microservices open all the time to the microservices of the microservice chain(s) may leave microservices open to unnecessary exposure and security risks. Therefore, there is a need for automating configurations of the microservice ports to limit the unnecessary exposure to other microservices of the microservice chain(s) and enabling ports securely, as needed, without requiring administrators to manually configure ports for communication between microservices.

Embodiments of the present disclosure recognize a need for managing and dynamically automating service mesh communications between microservices, as well as eliminating unnecessary exposure of microservice ports to increase security of the microservices or the service mesh as a whole. Embodiments of the service mesh collects metrics of transactions between microservices, tracks via the control plane, the frequency at which microservices are communicating and whether communications between certain ports of the microservices are secure and/or need to be enabled or restricted. Based on findings of the control plane regarding port security and necessity for active communications between microservices, the service mesh may automatically configure which microservice ports are allowed to accept and receive service mesh traffic, while disabling unneeded and/or unsecure ports, improving the security of the service mesh communications between microservices by avoiding unnecessary exposure of the ports.

Embodiments of the present disclosure leverage data collection by the service mesh and apply machine learning models in order to predict future data, including but not limited to forecasting future communication interactions between microservices. During a learning period, the service mesh collects time series data of micro services accessing or communicating with other microservices of a microservice chain. For example, the control plane of the service mesh can collect the communication data during the learning period using the control handshake between proxies sending and receiving the communications. The collected data may include the time of day, the microservice that is the source of the communication, the microservice that is the destination service, the port being used and the duration of the communications. As the data is continuously collected, the slices of information describing communications are sent to machine learning models which may output forecasts predicting microservice interactions expected to occur in the future, the probability of such communications occurring, and/or the confidence level of the predictions being made by the machine learning models. Using the predicted requirements for facilitating communications between microservices of the service mesh, an allowed list of communications can be generated describing the microservices allowed to send and receive communications, duration of communications allowed, when such communications are allowed, and the ports that will be used for facilitating the communication between microservices. Moreover, in some embodiments, administrators of the service mesh may manually override the one or more approved aspects of the dynamically generated allowed list configured automatically by the service mesh.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
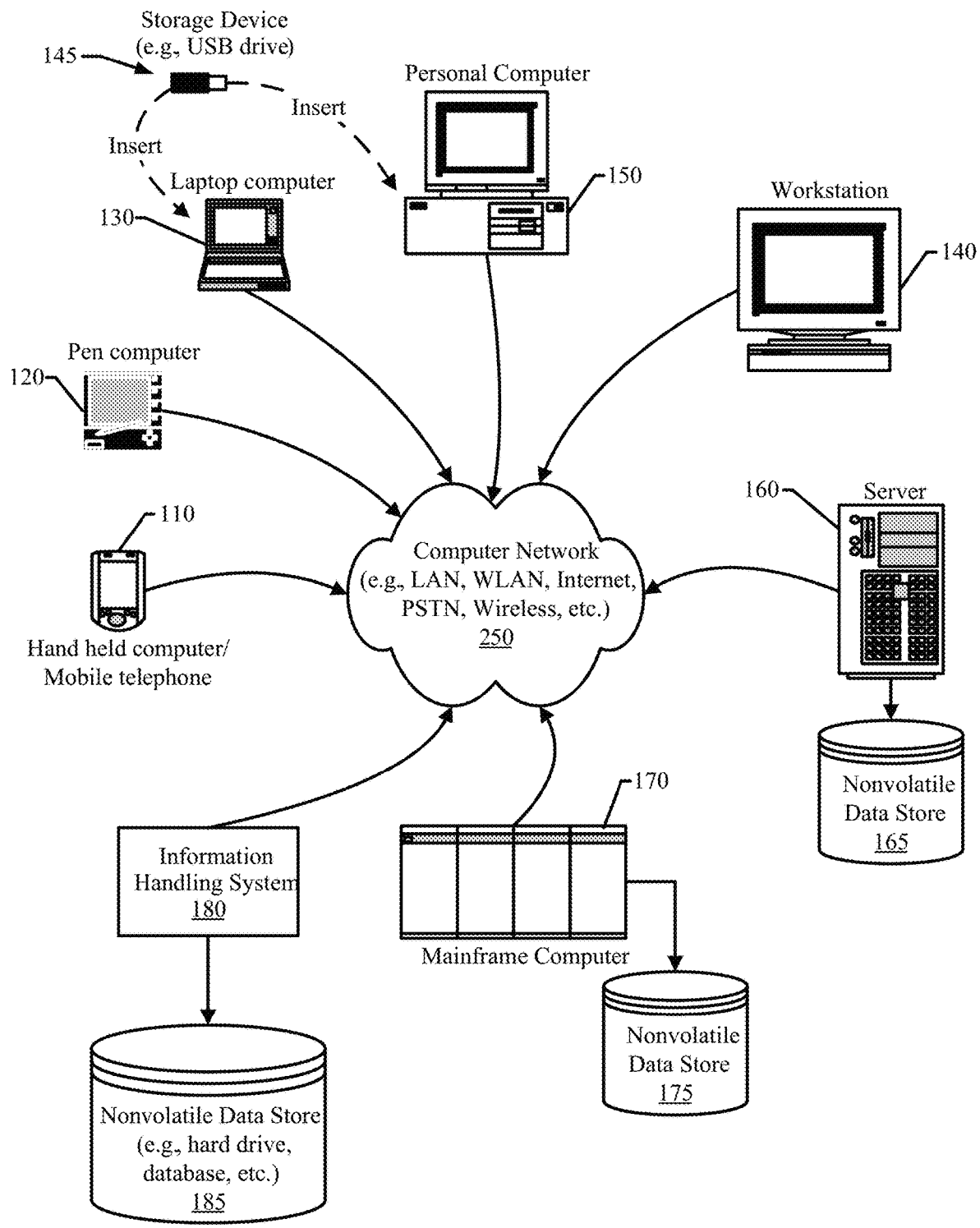
FIG. 2 depicts a block diagram illustrating an extension of the computing system environment of FIG. 1, wherein the computing systems are configured to operate in a network environment and perform methods described herein in accordance with the present disclosure.

FIG. 2 provides an extension of the computing system 100 environment shown in FIG. 1 to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
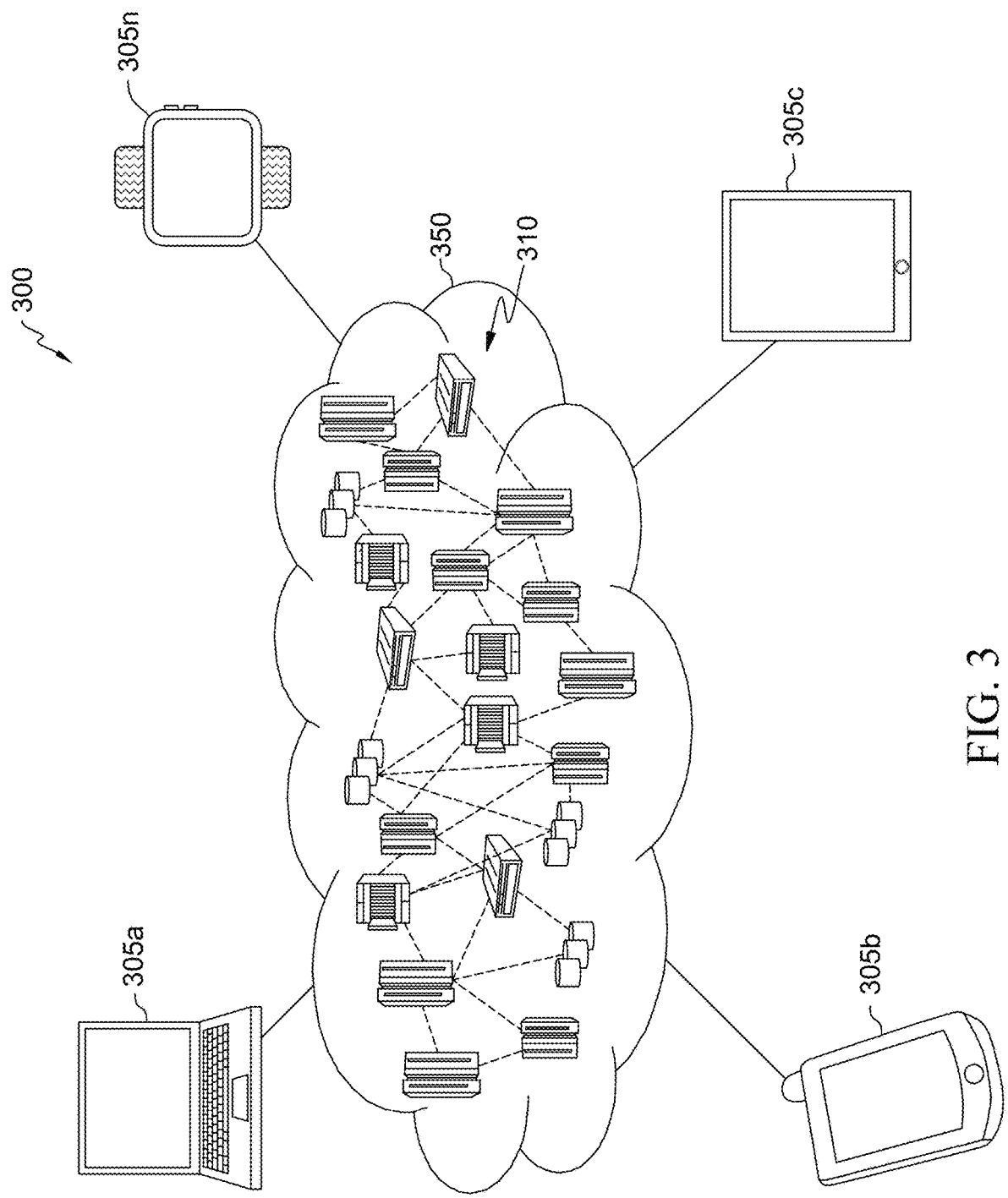
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305*a*-305*n* (referred to generally herein as end user device(s) 305) or client devices, may be used by cloud consumers to access one or more software products, services, applications, and/or workloads provided by cloud service providers or tenants of the cloud network 350. Examples of the user device(s) 305 are depicted and may include devices such as a desktop computer, laptop computer 305*a*, smartphone 305*b* or cellular telephone, tablet computers 305*c* and smart devices such as a smartwatch 305*n* and smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices 305 shown in FIG. 3 are intended to be illustrative only and that computing nodes 310 of cloud computing environment 300 can communicate with any type of computerized device over any type of network and/or network addressable connection (e.g., using a web browser).

Figure 4:
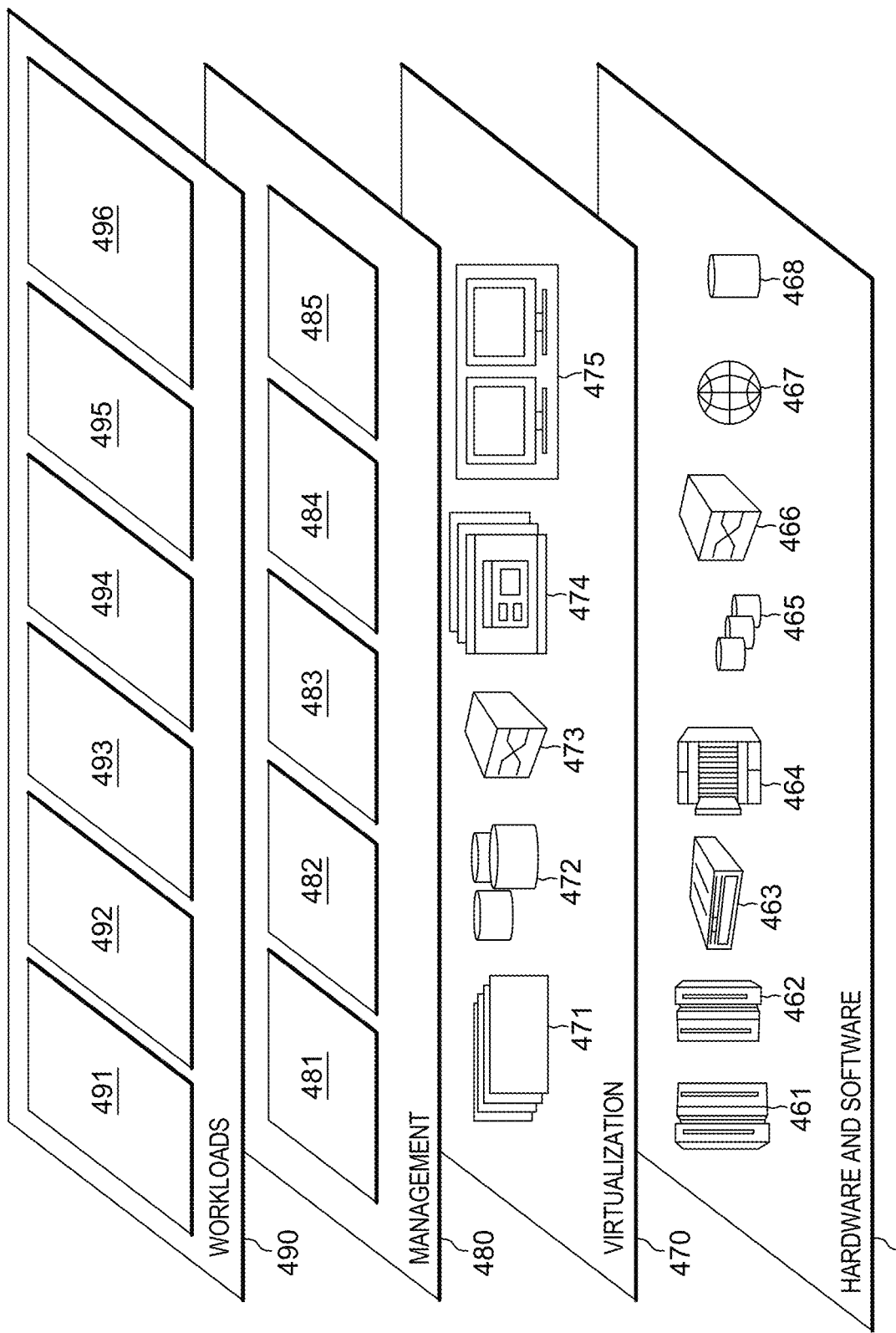
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, multi-cloud management 493, transaction processing 494; database management 495 and video conferencing 496.

System for Managing Port Configurations of Microservices within a Service Mesh

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
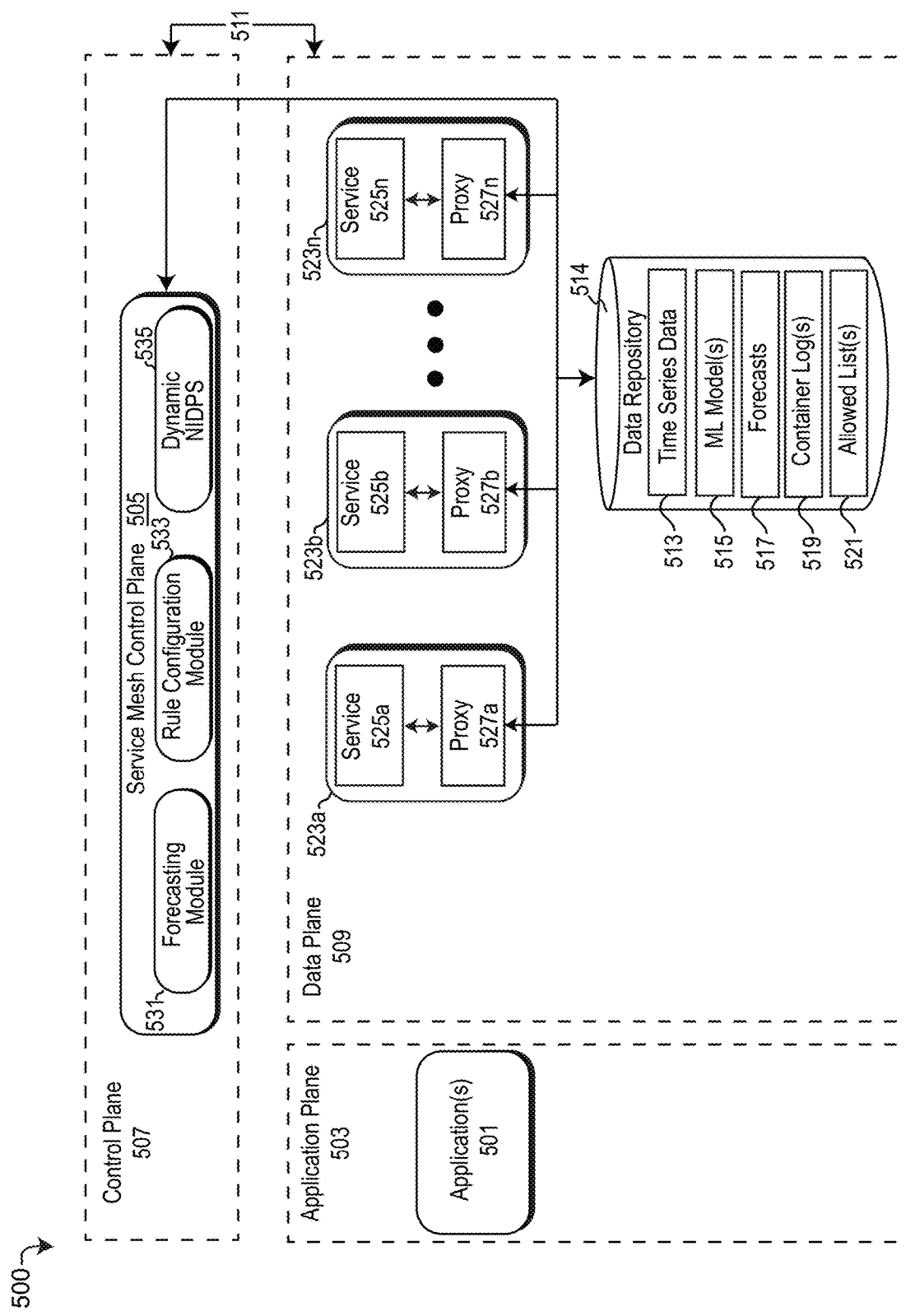
FIG. 5 depicts a functional block diagram describing an embodiment of a service mesh computing environment for managing port configurations of microservices within a service mesh, in accordance with the present disclosure.

Referring to the drawings, FIG. 5 depicts an embodiment of a computing environment 500 illustrating a microservice architecture that can be executed on one or more computing systems 100 and variations thereof. As illustrated in the embodiment of the computing environment 500, a plurality of planes (or layers) of the environment 500 are placed in communication with one another. As depicted, the computing environment 500 includes (but is not limited to) an application plane 503 comprising one or more application(s) 501, a control plane 507 and a data plane 509.

Embodiments of the application plane 503 may be the layer of the network comprising one or more application(s) 501 that may make requests for network functions and services provided by the control plane 507 and/or data plane 509. The combination of the control plane 507 and the data plane 509 make up the service mesh 511. Users accessing the applications 501 of the application plane 503 may input requests for services and/or functions of the service mesh 511 network by interacting with a user interface (UI) of the application 501. For example, an application UI displayed by an end user device or client device. In response to requests for services by users or other services, a microservice chain comprising a plurality of microservices 525a-525n (generally referred to herein as microservices 525 or services 525) may be invoked causing the microservices 525 to communicate with one another and transmit data. Embodiments of end user devices or client devices may request the services or functions from the other planes of the service mesh 511 by inputting or transmitting one or more calls from an interface of application(s) 501 to the service mesh 511. More specifically, in exemplary embodiments, API calls may request the execution of one or more capabilities or functions of the microservices 525.

Embodiments of the application UI transmitting requests may be part of a mobile application, web application, SaaS application, etc. For example, mobile applications may be inputting requests and routing data through the service mesh 511 by transmitting an API call to an API gateway of the network. In other examples, client devices may use a command line interface (CLI) to input commands and requests to the service mesh 511 and/or a web-based UI transmitting an HTTP request via a web browser. Transaction requests to one or more microservices 525 of an application 501 may be initiated by external user(s), and/or external services incoming from outside of service mesh 511 network.

Referring now to the data plane 509, embodiments of the data plane 509 may be responsible for touching every packet of data and/or incoming call requesting services from the service mesh 511. In other words, the data plane 509 of the service mesh 511 may be responsible for conditionally translating, forwarding, and observing every network packet that flows to and from the instances 523a-523n (hereinafter referred to generally as instances 523) of services 525 (and replicas thereof) and/or proxies 527a-527n (hereinafter proxies 527) within the service mesh 511. As illustrated in the exemplary embodiment of FIG. 5, the data plane 509 may comprise a plurality of instances 523, which can be in the form of one or more clusters, pods, or containers hosting a microservice 525 within the instance 523. Embodiments of each service 525 may be co-located within an instance 523 with a sidecar network proxy 527 injected into the instance 523. For example, as shown in FIG. 5, service 525a is co-located with proxy 527a within instance 523a; service 525b is co-located with proxy 527b within instance 523b; and service 525n is co-located with proxy 527n within instance 523n of the data plane 509. Network traffic (e.g., HTTP, REST, gRPC, Redis, etc.) being routed along microservice chains comprising more than one individual microservice 525 may flow via the local proxies 527 to a destination microservice routed by the service mesh 511, in accordance with the routing rules and policies of the service mesh 511, such as the allowed list 521 controlling inter-microservice communications and restrictions as described in detail herein. Since the data flows from the services 525 to the co-located proxy 527, the services 525 may not be aware of the network of services at large that may form the data plane 509. Instead, the services 525 themselves may only be aware of their local proxy 527.

Embodiments of the proxies 527 may be responsible for performing tasks associated with service discovery, health checking, routing, load balancing, authentication/authorization, and observability. Service discovery tasks may include discovery of upstream and/or backend services 525 and instances 523 thereof that are available on the data plane 509 of the service mesh 511. Health checking tasks may include determining whether upstream services 525 and instances 523 thereof returned by service discovery are healthy and ready to accept network traffic. Health checking may include both active health checking and/or passive health checking.

Routing tasks of the proxies 527 may include directing requests to a proper instance 523, such as a cluster, pod or container of a service 525. For example, a REST request for a local instance 523a of a service 525a, a proxy 527a tasked with sending an outbound communication to the next service 525b of a microservice chain knows where to send the communication according to the routing rules and configurations of the service mesh 511. For example, routing rules may include allowed lists 521 of microservices 525 permitted to send network traffic to other microservices 525 of the microservice chain and/or receiving incoming traffic from other microservices 525, via specific ports 601a-n, 603a-n authorized by the service mesh 511 for facilitating the communications. Authentication and authorization tasks of the proxies 527 may include the performance of cryptographic attestation of incoming requests in order to determine if the request being invoked by an API call is valid and allowable. For example, the user sending the requested call is authenticated by the proxy 527 using Mutual Transport Layer Security (mTLS) or another mechanism of authentication, and if the user is allowed to invoke the requested endpoint service of the service mesh 511, the proxy 527 may route the request to the next service 525 along the microservice chain. Otherwise, the proxy 527 can return a response to the user or external service indicating that the requesting user or service is not authorized to invoke a particular call function and/or a user is not authenticated by the service mesh 511.

Embodiments of the proxies 527 may perform one or more observability tasks and network functions of the service mesh 511 in response to API calls and communications being routed between proxies 527 of the microservice chain being invoked. The observability tasks may include, for each API call, collecting historical call information as detailed time series data 513 about the service mesh 511, including statistics including time day the call occurred, a source service outputting the call to a second microservice, a destination microservice receiving the call from the source service, the type of call or communication occurring, the data involved, one or more ports 601a-n, 603a-n being used to send and/or receive the communications, duration of microservice 525 usage, which user profile executed the call, the success or failure of the call, which microservice chains were invoked, the time the call was placed, etc. Observability tasks may also include generation of distributed tracing data that may allow operators and administrators of the service mesh 511 to understand the distributed traffic flow of the service mesh 511. Embodiments of the service mesh 511 may keep track of all possible services 525 being invoked by users and may track the functions or capabilities of services 525 being invoked on a per user basis then store the data associated with the user's invoked services 525 to profiles associated with the users (i.e., user profiles). Over time, the service mesh 511 may build a database comprising historical data metrics collected as time series data 513 by the proxies 527 as requested calls are made and fulfilled by the service mesh 511. Embodiments of the service mesh 511 can use the collected data to keep track of all API calls being made to the service mesh 511. More specifically, embodiments of the service mesh control plane 505 can keep track of all microservice chains, and all microservices communicating with each other within each of the microservice chains. Historical data collected and stored as time series data 513 can further track how frequently microservices 525 communicate with each other, whether or not vulnerabilities of containers or other instances 523 of the microservices 525 exist and/or whether one or more microservices 525 communicating within a microservice chain may be considered insecure. Table 1 as shown below provides an example of the time series data 513 collected by the service mesh 511:

TABLE 1

| Time Series Data | | | | |
| --- | --- | --- | --- | --- |
| Time of Day | Source Service | Destination Service | Port | Duration of Use |
| 13:22:18 | M2 | M3 | 8081 | 6 seconds |
| 13:22:07 | M1 | M2 | 8081 | 10 seconds |
| 11:33:03 | M2 | M5 | 8080 | 1 second |
| 11:33:00 | M7 | M2 | 8080 | 2 seconds |

In the exemplary embodiment of FIG. 5, the database collecting time series data 513 of the service mesh 511 may be referred to data repository 514. Proxies 527 of the service mesh 511 may collect and store a plurality of different metrics as time series data 513 to one or more data repository 514 over time, along with user profiles associated with the time series data 513 being collected. For example, the time series data being collected by the service mesh 511 may be represented as historical data describing past API calls and communications between the microservices 525 of microservice chains, including (but not limited to) the type of API call being made, time stamps describing the time the communication occurs, the source microservice, the destination microservice, the port(s) being used, duration of the communications, the types of errors, warnings and failures that are occurring from the API calls, security events, timeout events between microservices 525, etc. Furthermore, embodiments of the data repository 514 may additionally store machine learning model(s) 515 (ML model(s) 515), predictive forecasts 517 about future microservice communications, container log(s) 519 and allowed list(s) 521 of permitted communications between microservices 525.

Embodiments of the control plane 507 of the service mesh 511, may configure the data plane 509 based on a declared or desired state of the service mesh 511. The control plane 507 may be the portion or part of a network responsible for controlling how data packets are forwarded from a first location of the network to a destination of the network, the route the data will take to arrive at a destination and network functions that may control the flow of the data packets. Control plane 507 may be responsible for creating a routing table, routing rules, and implementing various protocols to identify the network paths that may be used by the network. The control plane 207 can store the network paths to the routing table. Examples of protocols used for creating routing tables may include Border Gateway Protocol (BGP), Open Shortest Path First (OSPF), and/or Intermediate System to Intermediate System (IS-IS).

Embodiments of the control plane 507 may include a service mesh control plane 505, which may turn all the data planes 509 of the service mesh 511 into a distributed system. The service mesh control plane 505 may provide the rules, policies and/or configurations enacted for each of the running data planes 509 of a service mesh 511, but the service mesh control plane 505 does not touch the data packets or requests transmitted by the user(s) or external service(s) making calls. For example, service mesh control plane 505 may utilize the service mesh metrics and time series data 513 collected from the proxies 527 and/or microservices 525 of the service mesh 511 to track all communications between microservices of the service mesh 511. The service mesh control plane 505 can configure network policies that can be pushed to the proxies 527 and in doing so may control: communications between the microservices 525 of invoked microservice chains and ports of communication; the fulfillment API calls; secure the service mesh 511 from intrusion or exploitation of vulnerabilities of microservice(s) 525; and/or the ability of specific users to utilize the services of the service mesh 511.

Embodiments of the service mesh 511 may be initially configured by a human administrator interacting with the service mesh control plane 505 via a UI to control the distributed system of the service mesh 511. For example, the administrator may interact with the service mesh control plane 505 through a web portal, CLI or some other interface. Through the UI, the operator or administrator may access global system configurations for the service mesh 511, including but not limited to, deployment control, authentication and authorization settings, route table specifications, initial application logging settings and load balancer settings such as timeouts, retries, circuit breakers, etc.

Embodiments of the service mesh control plane 505, may further include additional components that configure the service mesh 511. For example, in some embodiments, the service mesh control plane 505 may further configure a workload scheduler, service discovery, sidecar proxy configuration APIs, a forecasting module 531, rule configuration module 533 and/or dynamic network intrusion detection and prevention service (NIDPS). The services 525 may run on infrastructure via a scheduling system (e.g., Kubernetes®), and the workload scheduler may be responsible for bootstrapping a service 525 along with a sidecar or proxy 527. As the workload scheduler starts and stops instances 523 of the services 525, the service discovery component may report the state of services 525 and may be the process responsible for automatically finding instances 523 of services 525 to fulfill requests of incoming API calls. Embodiments of sidecar proxy configuration APIs may describe the configuration of the proxies 527 mediating inbound and outbound communication to the services 525 attached to the proxies 527. During configuration of the proxies 527, all proxies 527 may be programmed in the service mesh 511 with configuration settings that may allow the proxies 527 to reach every instance 523 and service 525 of the service mesh 511 in some instances. Conversely, proxies 527 can be configured to follow one or more allowed list(s) 521, responsible for managing and limiting communications between microservices 525 based on one or more forecasts of the forecasting module 531 as described herein. Moreover, the sidecar proxy configuration APIs may, in some embodiments, configure the proxies 527 to accept traffic on all ports 601, 603 associated with a service 525, while in other embodiments a selection of ports may be designated by one or more allowed list(s) 521. Furthermore, through the sidecar proxy configuration APIs, the service mesh control plane 505 may fine tune the set of ports 601, 603, and protocols that a proxy 527 may accept when forwarding traffic to and from an instance 523 and services 525. Additionally, through the sidecar proxy configuration APIs, the service mesh control plane 505 may restrict a set of services 525 that a proxy 527 may reach when forwarding outbound traffic from a service 525 or instance 523, in accordance with allowed list(s) 521 of the service mesh 511.

Embodiments of the forecasting module 531 may be responsible for performing functions or tasks of the service mesh control plane 505 directed toward training one or more machine learning models 515 using time series data 513 collected by the service mesh 511 inputted into the forecasting module 531. Forecasting module 531 can output one or more forecasts 517 predicting future communications and interactions between microservices 525 of the microservice chains within a service mesh 511. As noted above, during learning period, the service mesh 511 continuously collects time series data 513 describing communications, calls, interactions, etc., between the microservices 525 of the microservice chain. As the time series data 513 is collected and stored, the forecasting module 531 may train one or more ML models 515 using the time series data, or portions thereof (referred to as "slices") collected during the learning period to predict future dates and times of interactions between various microservices 525. This training period implemented by the forecasting module 531 may be referred to as the "predictability establishment period."

During the phase of the predictability establishment period, embodiments of the forecasting module 531 may use ML models 515 one or more time series forecasting techniques to transform the time series data 513 into supervised learning. The forecasting module 531 may input the time series data 513 comprising observations about the communications between microservices 525 occurring sequentially in time and fitting the ML models 515 to the historical data in order to predict future observations as forecasts 517. Embodiments of the forecasts 517 comprise future data predicting future communications and interactions between the microservices of one or more microservice chains in the service mesh 511. The time series data 513 may be transformed into supervised machine learning by introducing lag times or lags which can shift the data backward in the time sequence established by the time series data 513.

In some embodiments, forecasting module 531 may use techniques for cross-validation of time series data 513 to predict future communications between microservices during a training period and validate the accuracy of the future predictions made by the forecasts 517 following the training phase using a validation set of data. Examples of these forecasting methods may include the sliding-window cross-validation method and the forward chaining cross-validation method. A sliding window method may train ML models 515 using a selected number of data points (n) of the time series data 513, then validate the predictions using the next n number of data points in the time series data 513 collected; i.e., by comparing the predictions with real data describing actual interactions between the microservices 525 providing the time series data 513. Embodiments of the forecasting module 531 may slide the training and validation window by 2n, and repeat the process continuously until the predictability achieved by the forecasts 517 outputted by the forecasting module 531 reach a threshold level of accuracy for the future predictions being validated. The threshold level of accuracy used to establish an acceptable level of predictability may be set by an administrator. For instance, the administrator may set the threshold level of accuracy to 85%, 90%, 92%, 95%, 97%, 99% accuracy or beyond.

In alternative embodiments, the forecasting module 531 may generate output forecasts 517 predicting future communications and interactions between microservices within a microservice chain using a forward chaining cross-validation method. Similar to sliding-window techniques, forward chaining cross-validation may train ML model(s) 515 using the last n number of data points from the time series data 513 to make predictions. The predictions are validated using a subsequent number of time series data points (m) collected as time series data 513 and compared with the predictions being forecasted by the forecasting module 531. The training and validation window slides forward in time n+m data points and repeats the prediction process by training ML model 515 using all previous data points collected as time series data 513. The cycle of training and validating predictions continues until a level of predictability by the forecasts 517 using the trained ML model 515 is as accurate or more accurate than the threshold level of accuracy. For example, a level of accuracy set by the administrator of the service mesh 511.

Once the level of accuracy achieved by the forecasts 517 of the forecasting module 531 reaches or exceeds the threshold level of accuracy for predicting the future interactions and communications between one or more microservices 525 of one or more microservice chains, the microservices 525 that can accurately be forecasted can be marked to enter a dynamic allowed list mode. Once entered into dynamic allowed list mode, the forecasting module 531 may still continue to generate forecasts 517 predicting future interactions and communications between microservices 525 of one or more microservice chains. Additionally, while in dynamic allowed list mode, the service mesh control plane 505 may further create, and/or modify one or more allowed list(s) 521 for each of the microservices 525 that can be accurately forecasted by the forecasting module 531. Each of the allowed lists 521 may be prepared or updated by rules configuration module 533 of the service mesh control plane 505 using the forecasts 517 comprising prediction requirements generated by the forecasting module 531. An allowed list 521 may refer to live lists of all rules which define the allowed list of all incoming traffic that may be accepted by microservices 525, including designated ports which may receive the traffic, the times of day traffic can be received from certain microservices, the length of time the incoming communications may last, etc. For example, if a microservice M1 is predicted by the forecasting module 531 to contact a microservice M2 each day at 10 AM for 5 minutes, an allowed list 521 for M2 may allow M2 to receive communications from M1 each day at 10 AM for the prescribed 5 minutes and outside of the allotted timeframe, restrict and/or prevent incoming communications from M1 from being received by restricting access to one or more incoming ports 601 assigned to the communications of M1.

Embodiments of the rule configuration module 533 may not only create and configure allowed lists 521 of rules corresponding to the microservices 525 of the service mesh 511, but the rules configuration module also 533 may further update the allowed lists 521 of the microservices 525 dynamically as circumstances change. For instance, rule configuration module 533 may remove a microservice 525 from an allowed list 521 based on an extended period of time wherein a microservice 525 fails to communicate with other microservices 525 in accordance with one or more forecasts 517. For example, if a microservice M1 is predicted to communicate daily with microservice M2 but M2 has not received the predicted communications from M1 for several days or another length of time that is beyond a threshold period of time, the rules configuration module 533 may check whether M1 is still listed as part of M2's allowed list 521 of microservices that it can receive incoming communications from. If M1 is still listed within M2's allowed list but has not sent communications for the period of time that is greater than the threshold period of time, the rules configuration module 533 can amend the allowed list 521 of M2 and dynamically remove M2 from the allowed list 521 and push the updated allowed list 521 to a proxy 527 of M2.

Proposed changes to the allowed lists 521 can be reviewed, modified and overridden by administrators of the service mesh. For example, in the example provided above, an admin may explicitly override the rule configuration module's change to M2's allowed list 521 which would remove M1 from the list and instead allow M1 to remain on the allowed list 521 of microservice M2. Alternatively, an admin may modify the allowed list to include a microservice 525 but may further place restrictions on acceptable incoming communications the microservice 525 may receive from another microservice. For instance, in the example of M1 and M2, an admin may manually restrict allowable communications M2 receives from M1 to a particular day of the week, time of day, period of days in a month, etc. Conversely, an admin may also override timing restrictions on future communications between microservices prescribed by the allowed lists 521 and may reconfigure the allowed list 521 in situations where a microservice has been unable to communicate with another microservice for a period of time that is longer than the threshold period of time because the first microservice has been attempting to communicate during a date or time outside of restrictions set by the allowed list of the second microservice. For instance, if an allowed list 521 is configured to allow a microservice to only communicate with another microservice on a particular day and/or time of day, and upon checking communication requests by the first microservice by the service mesh control plane 505, the service mesh control plane identifies attempts outside of the restrictions set by an allowed list 521, an admin may override the restriction and/or amend the allowed list to permit communications more broadly or by adjusting the dates and/or times wherein communications are permitted between the first and second microservice.

For example, if microservice M2 is permitted to accept incoming communications from microservice M1 during a scheduled period of time, such as on Saturdays at 10 AM to 11 AM, then according to the allowed list 521 for M2, communications from M1 at other days of the week and times are not accepted by M2 unless overridden by an administrator. If, upon failing to receive communications from M1 at the scheduled time for a threshold period of time, the service mesh control plane 505 may check whether M1 is still on the allowed list 521 for M2 and may identify communication attempts that are being made by M1 at a different date or time instead of the scheduled date or time predicted by the forecasting module 531. Checking on M1 may reveal that communications of M1 are being attempted outside of the permitted communications times prescribed by the allowed list 521 and therefore were being restricted. The lack of communication may have been identified after not receiving communications from M1 for the threshold period of time. In response to identifying changes in the communication behavior of M1 to M2, the rule configuration module 533 and/or admin may remove M1 from the allowed list 521 of M2 and/or may modify the restrictions of the allowed list 521 to match the communication patterns of M2 by changing the date and/or times prescribed by the allowed list of M2, therefore allowing future communications to occur at the new day and time consistent with M1's communication pattern.

As discussed above, in situations where a first microservice is listed on an allowed list 521 of a second microservice as being permitted to communicate with the second microservice, and the first microservice fails to communicate for a threshold period of time, the rules configuration module 533 may remove the first microservice from the allowed list 521. In some instances, the second microservice may receive an incoming communication from the first microservice following removal of the first microservice from the allowed list 521 due to lack of communication for the threshold period of time. Embodiments of the service mesh control plane 505 and/or rules configuration module 533 may permit the subsequent communication from the first microservice upon identifying whether or not a legitimate sequence of access code is being executed to facilitate the communication and not an unauthorized user who may have taken over one or more containers of the first microservice. Embodiments of the service mesh control plane 505 may identify the sequence of access code as being legitimate by recording container logs 519 of the containers making up the microservices 525. The service mesh control plane 505 can use recorded container logs executing the sequence of access code over time to predict whether it's the code being executed that is accessing the microservice receiving the incoming traffic or an intruder. Upon verification of the sequence of access code or input from an admin overriding a restriction of the incoming communication from the microservice, the incoming traffic may be permitted to be received by the second microservice. Moreover, if upon evaluating the container logs 519 the service mesh control plane 505 confirms the incoming communication is an intruder that has taken over one or more containers of the microservice attempting to communicate with the second microservice, the microservice can be fully prevented from communicating with the second microservice by removing the microservice from allowed lists 521 and/or blocking communication ports with the compromised microservice.

Embodiments of the service mesh control plane 505 may detect vulnerabilities or a security posture changes in one or more microservices 525 permitted to communicate with a second microservice as allowed by the allowed list 521. Embodiments of rule configuration module 533 may dynamically adjust the rules of the allowed list 521 in order to prevent previously permitted microservices from sending further communications to other microservices by removing the vulnerable microservices from the allowed list 521, unless the restriction of the vulnerable microservice is overridden by an administrator or the service mesh control plane 505 learns that the vulnerable microservice has been re-deployed without the previously identified vulnerabilities. For example, a vulnerability may include containers of a microservice running outdated software and attempting to communicate with another microservice using outdated access code (unless overridden by an administrator). A microservice 525 containing vulnerabilities that has been removed from an allowed list 521 may be taken offline and updated by the service mesh control plane 505. Upon re-deployment of the containers that comprise the microservice, the service mesh control plane 505 recording the container logs 519 can confirm the access code being executed by the re-deployed microservice is up to date and secure. Embodiments of the rule configuration module 533 may subsequently amend one or more allowed lists 521 and re-add the re-deployed microservice, permitted the re-deployed microservice 525 to communicate again with other microservices 525 of the service mesh 511.

In some embodiments, service mesh control plane 505 may amend all allowed lists 521 of downstream microservices within a microservice chain when an upstream microservice is found to be vulnerable, experienced a security posture change or taken over by an unauthorized user. For example, if a microservice chain comprises microservices M1 to M2 to M3 and microservice M1 is found to be vulnerable, rule configuration module 533 may not only remove M1 from the allowed list 521 of M2 but may also remove M2 from the allowed list 521 of M3. Preventing unauthorized communications from spreading downstream through the microservice chain unless an administrator explicitly overrides and/or until the previously vulnerable microservice re-deploys in a non-vulnerable state.

Embodiments of the service mesh control plane 505 may include a dynamic NIDPS component 535. Embodiments of dynamic NIDPS may be responsible for monitoring and detecting intrusions into the service mesh network that may violate security policies, acceptable use policies and/or security practices. The dynamic NIDPS 535 may operate within the service mesh 511 by placing vulnerable microservices 525 in a prevention mode that may still allow incoming connections without removing access to the microservice entirely by the service mesh 511 and/or allow microservices 525 to receive incoming connections from a potentially vulnerable microservice operating within prevention mode while monitoring the vulnerable microservice for signs of intrusion or unauthorized access to the containers thereof. By operating within prevention mode using a dynamic NIDPS 535, the service mesh 511 may make the vulnerable microservices more secure when microservice communications may deviate from normal scenarios, without having to block incoming connections between microservices entirely.

Figure 6B:
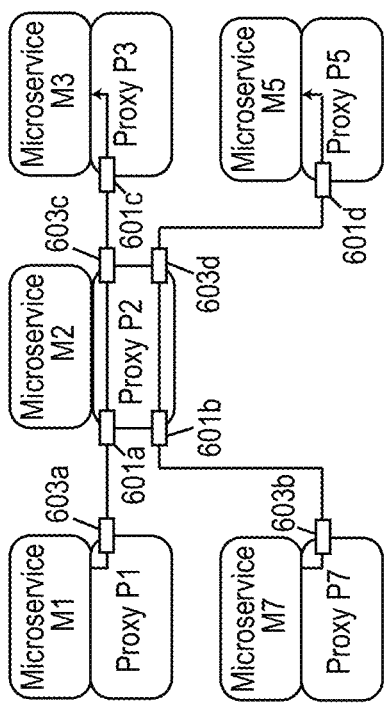
FIG. 6B depicts an exemplary embodiment of microservice chains of a service mesh comprising a plurality of microservices sending and/or receiving communications via one or more input ports and/or output pots, in accordance with the present disclosure.
Figure 6A:
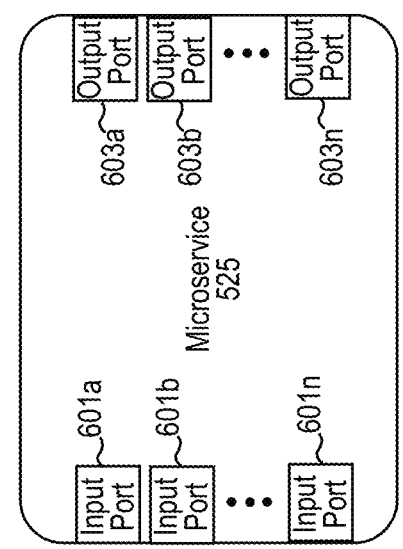
FIG. 6A depicts a block diagram describing an embodiment of a microservice comprising a plurality of input ports and/or output ports configured to send and receive communications between microservices of a service mesh.

Referring now to FIGS. 6A-6D, FIG. 6A depicts an embodiment of a microservice 525 or a proxy 527 thereof comprising a plurality of input ports 601a-601n for receiving incoming communications or calls from upstream microservices as well as a plurality of output ports 603a-603n transmitting outgoing communications and calls to downstream microservices. FIG. 6B depicts an example of two microservice chains which share a common microservice (microservice M2 in this instance) communicating with other microservices 525 of the microservice chains. Communications between the microservices 525 of the microservice chains are routed in accordance with rules established by the service mesh control plane 505 via output ports 603 sending outbound communications to input ports 601 receiving incoming communications. The input ports 601 and output ports 603 establish connectivity between the microservices in one or more microservice chains and control which microservices can approach each other in accordance with the allowed lists 521 by managing the ports 601, 603.

FIG. 6B demonstrates a flow of communication between multiple microservices allowed to approach the downstream microservices within two different microservice chains. As shown, a first microservice chain comprises microservice M1 to M2 to M3 and a second microservice chain containing microservices M7 to M2 to M5. In the instance of the first microservice chain, outbound communications from M1 leave output port 603a of proxy P1 and are received by proxy P2 via input port 601a. The communications designated for microservice M3 continue to be routed by proxy P2 as outbound communications exiting output port 603c. Outbound communications from P2 exiting output port 603c are routed to proxy P3 and enter the proxy P3 via input port 601c and are ultimately received by microservice M3. Likewise, they second microservice chain comprising M7, M2 and M5 may communicate separately from the first microservice chain and be independently managed despite sharing a common microservice (M2), by using different input ports 601 and output ports 603 for communications depending on the microservices M2 communicates with. For example, as shown in FIG. 6B, outbound communications from microservice M7 exit proxy P7 via output port 603b and are routed to input port 601b of proxy P2, rather than input port 601a which is being used for communications from microservice M1. Communications from microservice M7 which are destined for microservice M5 are outputted by proxy P2 via output port 603d (rather than 603c which are destined for microservice M3) wherein the incoming communications are received by proxy P5 at input port 601d and routed to the destination microservice M5.

Figure 6D:
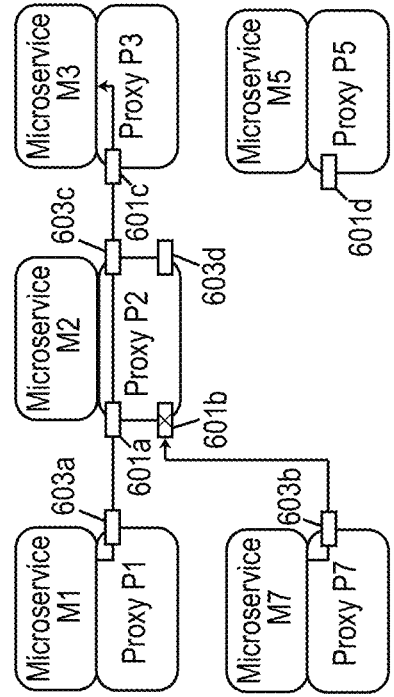
FIG. 6D depicts an embodiment of the microservice chains of FIG. 6C, wherein one or more ports receiving communications from a second microservice are disabled or restricted and/or the previously restricted or disabled ports receiving communications from a re-deployed first microservice are re-enabled, in accordance with the present disclosure.
Figure 6C:
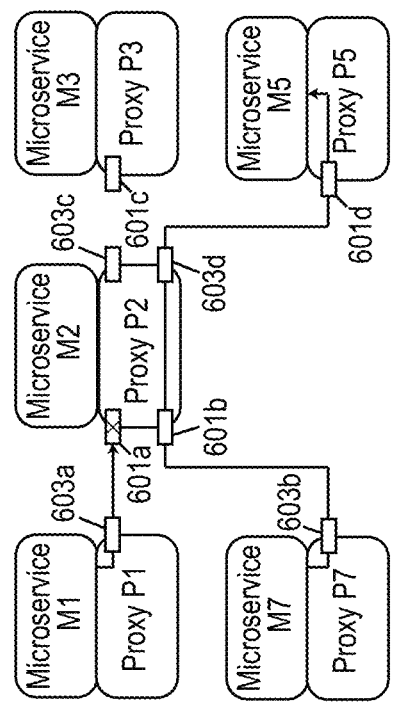
FIG. 6C depicts the embodiment of the microservice chains of FIG. 6B wherein one or more ports receiving communications from a first microservice are disabled or restricted, in accordance with the present disclosure.

FIG. 6C describes the flow of communications as shown in FIG. 6B, wherein the service mesh 511 may independently manage incoming communications from different microservices based on one or more independent forecasts 517 of the predicted microservice communications and allowed lists 521 configured for each microservice by the service mesh control plane 505. As shown in FIG. 6C, the communications for the microservice M7 to M2 to M5 continue to operate and be acceptable in accordance with the allowed list of microservice M2 and M5. However, as shown, incoming communications from M1 arriving at input port 601a have been stopped and not allowed to enter proxy P2. For example, in situations where the allowed list 521 of M2 only allows M1 to approach M2 at certain periods of time and outside of the allowed period of time as per M2's allowed list 521, prohibits M1 from approaching M2 at input port 601a and thus prevents communications from entering proxy P2. In another example, microservice M1 may have stopped communicating with microservice M2 for an extended period of time that is beyond a threshold period of time set by the service mesh 511. Therefore, in response to the lack of communications for the threshold period of time, the allowed list 521 for microservice M2 was modified to remove microservice M1 from communicating with M2, therefore prohibiting incoming communications from M1 to enter proxy P2 via input port 601a as shown. In another possible scenario, microservice M1 may be identified as being vulnerable to intrusion or other security risks that may impact M2. For example, outdated software running on containers that execute outdated access code when attempting to communication with microservice M2. In response to the identified security vulnerabilities of microservice M1, the allowed list 521 of M2 may be modified to prevent incoming communications via input port 601a unless or until an administrator overrides the rules of M2's allowed list 521 or the vulnerabilities of M1 are addressed or fixed by a re-deployment of M1.

Referring now to FIG. 6D, the embodiments of FIG. 6D describes a change in the flow of communications over time between microservices 525 of the plurality of microservice chains. More specifically, FIG. 6D demonstrates how permitted communications between microservices 525 as governed by the rules of the allowed lists 521 can change over time. Microservices 525 that were previously removed from allowed lists 521 or prevented from communicating with other microservices 525 can be dynamically re-permitted to engage in communications again. For example, as discussed above with regards to FIG. 6C, the allowed list 521 for microservice M2 was shown to have previously blocked communications incoming from microservice M1 via input port 601a. However, as shown in FIG. 6D, the incoming communications from microservice M1 are allowable again, as per the rules of microservice M2's allowed list 521 and/or via an administrative override. For instance, outgoing communications from proxy p1 via output port 603a may be occurring during a predicted time period considered to be allowable by the allowed list 521 maintained by proxy P2. Therefore, instead of blocking communications as shown in FIG. 6C, proxy P2 may accept the incoming communications at input port 601a and route the communications as prescribed to proxy P3. Likewise, if the reason for communications being blocked from microservice M1 in FIG. 6C was due to vulnerabilities or potential intrusions of the containers or other instances 523 being run by M1, then upon updating and re-deploying microservice M1 in FIG. 6D, M1 may no longer be considered vulnerable or insecure and therefore may be re-added to the allowed list 521 of microservice M2, thus permitting communications to be received at proxy P2 and routed to proxy P3 as shown.

Moreover, as exemplified by the changes in the embodiments of FIG. 6B to FIG. 6D, the previously permissible communications of microservice M7 are depicted as being dynamically restricted at the input port 601b of proxy P2. For example, in situations where the allowed list 521 of M2 previously allowed M7 to approach M2 at during the period of time depicted in FIG. 6B and FIG. 6C, FIG. 6D may describe a period of time as per M2's allowed list 521 that prohibits M7 from approaching M2 at input port 601b and thus prevents communications from entering proxy P2. For instance, such a period may be established to limit exposure of the input port 601b during period of time wherein M7 is not forecasted by the forecasting module 531 to be sending communications along the microservice chain M7 to M2 to M5 and thus the allowed list 521 closed the input port 601*b*. In another example, microservice M7 may have stopped communicating with microservice M2 for an extended period of time that is beyond a threshold period of time set by the service mesh 511. Therefore, in response to the lack of communications for the threshold period of time, the allowed list 521 for microservice M2 was modified to remove microservice M7 from communicating with M2, therefore prohibiting incoming communications from M2 to enter proxy P2 via input port 601*b* as shown. In another possible scenario, microservice M7 may be identified as being vulnerable to intrusion or other security risks that may impact M2. For example, outdated software running on containers that execute outdated access code when attempting to communication with microservice M2. In response to the identified security vulnerabilities of microservice M7, the allowed list 521 of M2 may be modified to prevent incoming communications via input port 601*b* unless or until an administrator overrides the rules of M2's allowed list 521 or the vulnerabilities of M7 are addressed or fixed. Such as through an update and a re-deployment of M7.

Method for Managing Port Configurations of Microservices within a Service Mesh

Figure 7:
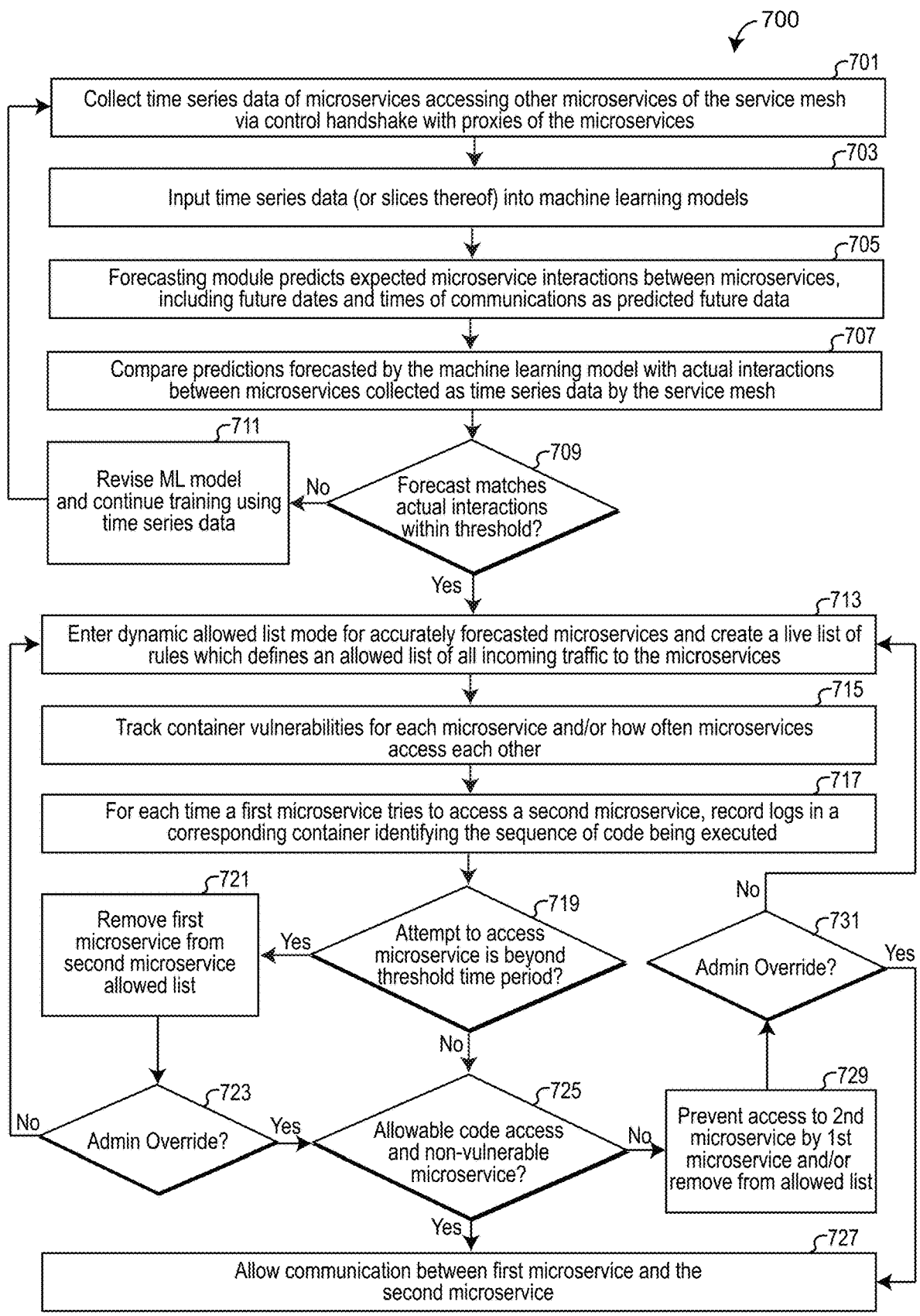
FIG. 7 depicts a flow diagram describing an embodiment of a method for managing port configurations of microservices within a service mesh, in accordance with the present disclosure.

The drawings of FIG. 7 represent embodiments of methods for implementing a service mesh 511 capable of managing port configurations and communications between microservices of a service mesh, in accordance with FIGS. 3-6D described above, using one or more computing systems defined generically by computing system 100 of FIGS. 1-2; and more specifically by the embodiments of specialized systems depicted in FIGS. 3-6D and as described herein. A person skilled in the art should recognize that the steps of the method described in FIG. 7 may be performed in a different order than presented and may not require all the steps described herein to be performed.

The embodiment of method 700 described by FIG. 7 may begin at step 701. During step 701, the service mesh 511 may collect time series data 513 historically describing microservices accessing and/or communicating with other microservices of the service mesh 511. The microservices 525 communicating with one another may be part of a microservice chain fulfilling a request or API call invoking the microservice chain comprising the microservices 525. Embodiments of the service mesh control plane 505 can track all possible microservice chains of the service mesh 511, as well as all communications between microservices 525 of the microservice chains by storing and analyzing the historical data as time series data 513 describing the communications. Time series data 513 can be collected at data plane 509 of the service mesh 511 by the proxies 527 as part of the control handshake between the proxies 527 sending and receiving the communications.

In step 703, the time series data 513 and/or sliced portions thereof being continuously collected by the service mesh 511, may be inputted into one or more machine learning models 515 (ML Model(s) 515) trained by the forecasting module 531 of the service mesh control plane 505 to predict future communications between the microservices 525 based on historical communications of the microservices 525 as described by the collected time series data 513. During this predictability establishment period of the ML model(s) 515 can be trained and transformed using supervised learning to predict future dates and times of expected communications between microservices. During step 705, the forecasting module 531 outputs one or more predictions describing expected future interactions between microservices 525 of a microservice chain, including predicted future dates and time communications are predicted to occur.

In step 707 the accuracy of the predictions forecasted by the ML model(s) 515 can be assessed to determine whether or not the predictions of future communications between microservices are considered accurate enough to deploy. The predictability and accuracy of the ML model(s) 515 may be assessed by comparing predictions describing expected future communications and interactions between microservices 525 forecasted by the ML model 515 and outputted by the forecasting module 531, with actual, subsequent interactions and communications between the microservices 525 that have been collected as time series data 513 by the service mesh 511. In step 709, a determination is made whether the forecasted predictions of the ML model 515 match actual interactions and communications between the microservices within a threshold level of accuracy in order to achieve an acceptable level of predictability. For example, an administrator may require a threshold level of predictions to be accurate with 97% accuracy before adopting ML model 515 predictions and use of said predictions to generate allowed lists 521. If the predictions forecasted by the ML model(s) 515 using the time series data 513 are not validated with actual subsequent interactions and communications within a threshold level of accuracy prescribed by the service mesh 511, the method 700 may proceed to step 711. In step 711, the forecasting methods and/or ML model (s) 515 used to generate the predictions of future interactions may be revised and/or the ML model(s) 515 may be continuously trained using additional time series data 513 collected by the service mesh. Conversely, if in step 709, the predictions forecasted by the ML model(s) 515 match actual future interactions and communications between microservices 525 of the service mesh with a level of accuracy that correctly makes predictions at, or above, and established accuracy threshold, the method 700 may proceed to step 713.

In step 713, the service mesh control plane 505, and more specifically, the rule configuration module 533 one or more microservices 525 that can be accurately predicted for future communications may enter a dynamic allowed list mode. The dynamic allowed list mode may be used to create live lists of rules for the microservices 525 that are being forecasted with accurate predictions describing future interactions or communication by the ML model(s) 515. The rules configuration module 533 may define allowed list(s) 521 for each of the microservices 525. Embodiments of the allowed lists 521 may include rules describing incoming traffic and/or outgoing communications allowed to be sent or received by the microservices 525, acceptable ports for sending and/or receiving the traffic between microservices and/or times of day when such incoming or outgoing communications are considered allowable by the service mesh control plane 505. In situations wherein incoming or outgoing communications are outside of the rules set by the allowed list(s) 521 generated by rules configuration module 533, an administrator of the service mesh 511 may override the established rules. For example, If a microservice M1 is predicted by the forecasting module 531 to contact microservice M2 every day for 5 minutes at 10 AM, the allowed list 521 may include a rule that allows M1 and M2 to communicate for 5 minutes at 10 AM, otherwise such communications may be restricted or prevented from occurring unless an administrator overrides the rules of the allowed list 521 and approves communications between M1 and M2 outside the of limited rule prescribed by the allowed list 521.

In step 715, service mesh control plane 505 of the service mesh may track vulnerabilities for each instance 523 of microservices 525 deployed, including for example, vulnerabilities of deployed containers, pods, clusters, etc. Service mesh control plane 505 may continuously check historical data to calculate how frequently microservices on the allowed list(s) 521 are communicating with each other and/or whether or not sequences of code used to access microservices 525 are legitimate access codes or intruders attempting to access the recipient microservice 525. Checking for legitimate access codes and/or intrusion attempts may help verify security of the microservice chains in order to prevent a vulnerable or insecure first microservice on an allowed list 521 from accessing or communicating with the second microservice. In step 717, for each time a first microservice is attempting to access or communicate with a second microservice, the service mesh control plane 505 may record within one or more container logs 519 a corresponding container, pod, or cluster executing a sequence of code as part of the access or communication attempt by the first microservice.

In step 719, a determination is made whether or not the attempt to access the second microservice by the first microservice is beyond a threshold period of time since the previous communication between the microservices 525. For example, an administrator may set a threshold period of time, such as 12 hours, 24 hours, 5 days, 2 weeks, a month, etc. wherein a communication outside of the threshold period of time may be considered too long and leaving ports open on the second microservice to receive a communication from the first microservice may make the second microservice vulnerable. If the attempt to access or communicate with the second microservice are outside of the threshold period of time, the service mesh control plane 505 may in step 721 remove the first microservice from the allowed list 521 of the second microservice. In step 723 a further determination may be made whether or not an administrator of the service mesh 511 has overridden the removal of the first microservice from the allowed list 521 of the second microservice. If the administrator has overridden the decision to remove the microservice from the allowed list 521, the method 700 may proceed to step 725, otherwise, the method 700 may return to step 713 and revise the live list of rules encompassed by the allowed list 521, finalizing the removal of the first microservice from the allowed list 521.

Referring back to step 719, if the attempt to access the microservice is within the threshold time period, the method 700 may proceed to step 725. During step 725 the service mesh control plane 505 may further determine whether or not the sequence of code being executed is an allowable access code and whether or not the first microservice attempting to the access the second microservice is a non-vulnerable microservice (i.e., an insecure microservice that may be vulnerable to intrusion), based on the recorded container logs 519. If the sequence of code being executed to access the second microservice is allowable and/or up to date (i.e., via upgrades or patches applied to a re-deployed first microservice) and thus not a security threat to the second microservice or indicative of the presence of an intruder, the method 700 may proceed to step 727, wherein the communication between the first microservice and the second microservice is considered allowable per the allowed list 521. Conversely, if the sequence of code being executed by the first microservice is not an allowable access code, the access code is outdated indicating the first microservice is vulnerable to intrusion and/or the actions of seeking access or communication indicate intrusion onto the first microservice, the method may proceed to step 729. During step 729, the service mesh control plane prevents access to the second microservice by the first microservice and/or removes the first microservice from the allowed list of the second microservice, unless an administrator overrides the removal in step 731.

In step 731, a determination is made whether or not an override has been commenced by an administrator of the service mesh, preventing the restriction on the first microservice's access to the second microservice. If the administrator overrides the restriction, the method may proceed to step 727, whereby the communication between the first microservice and second microservice are allowed in accordance with the list of rules provided by the allowed list 521. On the other hand, if in step 731 the administrator does not override the restriction of the first microservice, the method may proceed to step 713, wherein the live list of rules defined by the allowed list 521 for the second microservice is amended, preventing the second microservice from being accessed by the first microservice.

What is claimed is:

1. A computer-implemented method for managing port configurations of microservices within a service mesh, the computer-implemented method comprising:

collecting, by the service mesh, time series data describing communications between a first microservice and a second microservice of a microservice chain;

tracking, by the service mesh, historical communications between the first microservice and the second microservice;

forecasting, by the service mesh, future communications between the first microservice and second microservice of the microservice chain based on the time series data collected by the service mesh and patterns of the historical communications tracked by the service mesh;

generating, by the service mesh, as a function of forecasting the future communications, an allowed list describing one or more permitted ports of the second micro service configured to receive incoming traffic from the first microservice;

identifying, by the service mesh, an absence of communication between the first microservice and the second microservice for a threshold period of time, or communications routed from the first microservice of the allowed list to the second microservice as being vulnerable to manipulation or insecure;

disabling, by the service mesh, the permitted ports of the second microservice configured to receive communications from the first microservice;

reconfiguring, by the service mesh, the allowed list, preventing the future communications between the first microservice to the second microservice recording, by the service mesh, logs of the first microservice or the second microservice, corresponding to one or more containers running on the first microservice or the second microservice;

identifying, by the service mesh, a sequence of code via log tracking;

predicting, by the service mesh, based on the log tracking of the sequence of code, that the first microservice is vulnerable to manipulation or insecure;

upgrading, by the service mesh, the sequence of code executable by the first microservice to an upgraded sequence of code; and upon re-deploying by the service mesh, the first microservice comprising the upgraded sequence of code, configuring the allowed list to enable communications from the first microservice to the second microservice via the permitted ports.

2. The computer-implemented method of claim 1, wherein the absence of communication between the first microservice and the second microservice occur outside of scheduled times of communication, and the reconfiguring of the allowed list enables the permitted ports to receive communications from the first microservice during the scheduled times of communication.

3. The computer-implemented method of claim 1, further comprising:

overriding, reconfigurations of the allowed list preventing communications between the first microservice and the second microservice by an administrator of the service mesh, enabling the communications between the first microservice and the second microservice that are otherwise disabled according to the allowed list.

4. The computer-implemented method of claim 1, wherein the step of identifying the communications routed from the first microservice of the allowed list to the second microservice as being vulnerable to manipulation or insecure further comprises:

recording, by the service mesh, logs of the first microservice or the second microservice, corresponding to one or more containers running on the first microservice or the second microservice;

identifying, by the service mesh, a sequence of code via log tracking; and predicting, by the service mesh, whether the sequence of code accessing the second microservice is access code executed by the first microservice or an intruder based on the log tracking.

5. The computer-implemented method of claim 1, wherein the time series data is collected by the service mesh from control handshakes between a proxy of the first microservice and a proxy of the second microservice.

6. The computer-implemented method of claim 1, wherein forecasting the future communications between the first microservice and second microservice further comprises:

training, by the service mesh, a machine learning model to predict the future communications using supervised learning of the time series data;

outputting from the machine learning model forecasted expected communications between the first microservice and the second microservice;

matching, by the service mesh, the forecasted expected communications outputted by the machine learning model with actual communications between the first microservice and the second microservice; and repeating the training, outputting and matching steps until the forecasted expected communications outputted by the machine learning model are accurately predicted above a threshold level of accuracy.

7. A computer system for managing port configuration of microservices within a service mesh comprising:

a processor; and a computer-readable storage media coupled to the processor, wherein the computer-readable storage media contains program instructions executing, via the processor, a computer-implemented method comprising:

collecting, by the processor, time series data describing communications between a first microservice and a second microservice of a microservice chain;

tracking, by the processor, historical communications between the first microservice and the second microservice;

forecasting, by the processor, future communications between the first microservice and second microservice of the microservice chain based on the time series data collected by the service mesh and patterns of the historical communications tracked by the service mesh;

generating, by the processor, as a function of forecasting the future communications, an allowed list describing one or more permitted ports of the second microservice configured to receive incoming traffic from the first microservice;

identifying, by the processor, an absence of communication between the first microservice and the second microservice for a threshold period of time, or communications routed from the first microservice of the allowed list to the second microservice as being vulnerable to manipulation or insecure;

disabling, by the processor, the permitted ports of the second microservice configured to receive communications from the first microservice;

reconfiguring, by the processor, the allowed list, preventing the future communications between the first microservice to the second microservice;

recording, by the processor, logs of the first microservice or the second microservice, corresponding to one or more containers running on the first microservice or the second microservice;

identifying, by the processor, a sequence of code via log tracking;

predicting, by the processor, based on the log tracking of the sequence of code, that the first microservice is vulnerable to manipulation or insecure;

upgrading, by the processor, the sequence of code executable by the first microservice to an upgraded sequence of code; and upon re-deploying by the processor, the first microservice comprising the upgraded sequence of code, configuring the allowed list to enable communications from the first microservice to the second microservice via the permitted ports.

8. The computer system of claim 7, wherein the absence of communication between the first microservice and the second microservice occur outside of scheduled times of communication, and the reconfiguring of the allowed list enables the permitted ports to receive communications from the first microservice during the scheduled times of communication.

9. The computer system of claim 7, further comprising:

overriding, reconfigurations of the allowed list preventing communications between the first microservice and the second microservice by an administrator of the service mesh, enabling the communications between the first microservice and the second microservice that are otherwise disabled according to the allowed list.

10. The computer system of claim 7, wherein the step of identifying the communications routed from the first microservice of the allowed list to the second microservice as being vulnerable to manipulation or insecure further comprises:

recording, by the processor, logs of the first microservice or the second microservice, corresponding to one or more containers running on the first microservice or the second microservice;

identifying, by the processor, a sequence of code via log tracking; and predicting, by the service mesh, whether the sequence of code accessing the second microservice is access code executed by the first microservice or an intruder based on the log tracking.

11. The computer system of claim 7, wherein the time series data is collected by the service mesh from control handshakes between a proxy of the first microservice and a proxy of the second microservice.

12. The computer system of claim 7, wherein forecasting the future communications between the first microservice and second microservice further comprises:

training, by the processor, a machine learning model to predict the future communications using supervised learning of the time series data;

outputting from the machine learning model forecasted expected communications between the first microservice and the second microservice;

matching, by the processor, the forecasted expected communications outputted by the machine learning model with actual communications between the first microservice and the second microservice; and repeating the training, outputting and matching steps until the forecasted expected communications outputted by the machine learning model are accurately predicted above a threshold level of accuracy.

13. A computer program product for managing port configuration of microservices within a service mesh comprising:

one or more computer-readable storage medium having computer-readable program instructions stored on the one or more computer readable storage medium, said program instructions executes a computer-implemented method comprising:

collecting, by the service mesh, time series data describing communications between a first microservice and a second microservice of a microservice chain;

tracking, by the service mesh, historical communications between the first microservice and the second microservice;

forecasting, by the service mesh, future communications between the first microservice and second microservice of the microservice chain based on the time series data collected by the service mesh and patterns of the historical communications tracked by the service mesh;

generating, by the service mesh, as a function of forecasting the future communications, an allowed list describing one or more permitted ports of the second microservice configured to receive incoming traffic from the first microservice;

identifying, by the service mesh, an absence of communication between the first microservice and the second microservice for a threshold period of time, or communications routed from the first microservice of the allowed list to the second microservice as being vulnerable to manipulation or insecure;

disabling, by the service mesh, the permitted ports of the second microservice configured to receive communications from the first microservice;

reconfiguring, by the service mesh, the allowed list, preventing the future communications between the first microservice to the second microservice;

recording, by the service mesh, logs of the first microservice or the second microservice, corresponding to one or more containers running on the first microservice or the second microservice;

identifying, by the service mesh, a sequence of code via log tracking;

predicting, by the service mesh, based on the log tracking of the sequence of code, that the first microservice is vulnerable to manipulation or insecure;

upgrading, by the service mesh, the sequence of code executable by the first microservice to an upgraded sequence of code; and upon re-deploying by the service mesh, the first microservice comprising the upgraded sequence of code, configuring the allowed list to enable communications from the first microservice to the second microservice via the permitted ports.

14. The computer program product of claim 13, wherein the absence of communication between the first microservice and the second microservice occur outside of scheduled times of communication, and the reconfiguring of the allowed list enables the permitted ports to receive communications from the first microservice during the scheduled times of communication.

15. The computer program product of claim 13, further comprising:

overriding, reconfigurations of the allowed list preventing communications between the first microservice and the second microservice by an administrator of the service mesh, enabling the communications between the first microservice and the second microservice that are otherwise disabled according to the allowed list.

16. The computer program product of claim 13, wherein the step of identifying the communications routed from the first microservice of the allowed list to the second microservice as being vulnerable to manipulation or insecure further comprises:

recording, by the service mesh, logs of the first microservice or the second microservice, corresponding to one or more containers running on the first microservice or the second microservice;

identifying, by the service mesh, a sequence of code via log tracking; and predicting, by the service mesh, whether the sequence of code accessing the second microservice is access code executed by the first microservice or an intruder based on the log tracking.

17. The computer program product of claim 13, wherein forecasting the future communications between the first microservice and second microservice further comprises:

training, by the service mesh, a machine learning model to predict the future communications using supervised learning of the time series data;

outputting from the machine learning model forecasted expected communications between the first microservice and the second microservice;

matching, by the service mesh, the forecasted expected communications outputted by the machine learning model with actual communications between the first microservice and the second microservice; and repeating the training, outputting and matching steps until the forecasted expected communications outputted by the machine learning model are accurately predicted above a threshold level of accuracy.

* * * * *